Oct. 25, 1938.   M. CHRISTENSEN ET AL   2,133,971
WELDING APPARATUS
Original Filed July 2, 1930   2 Sheets-Sheet 1
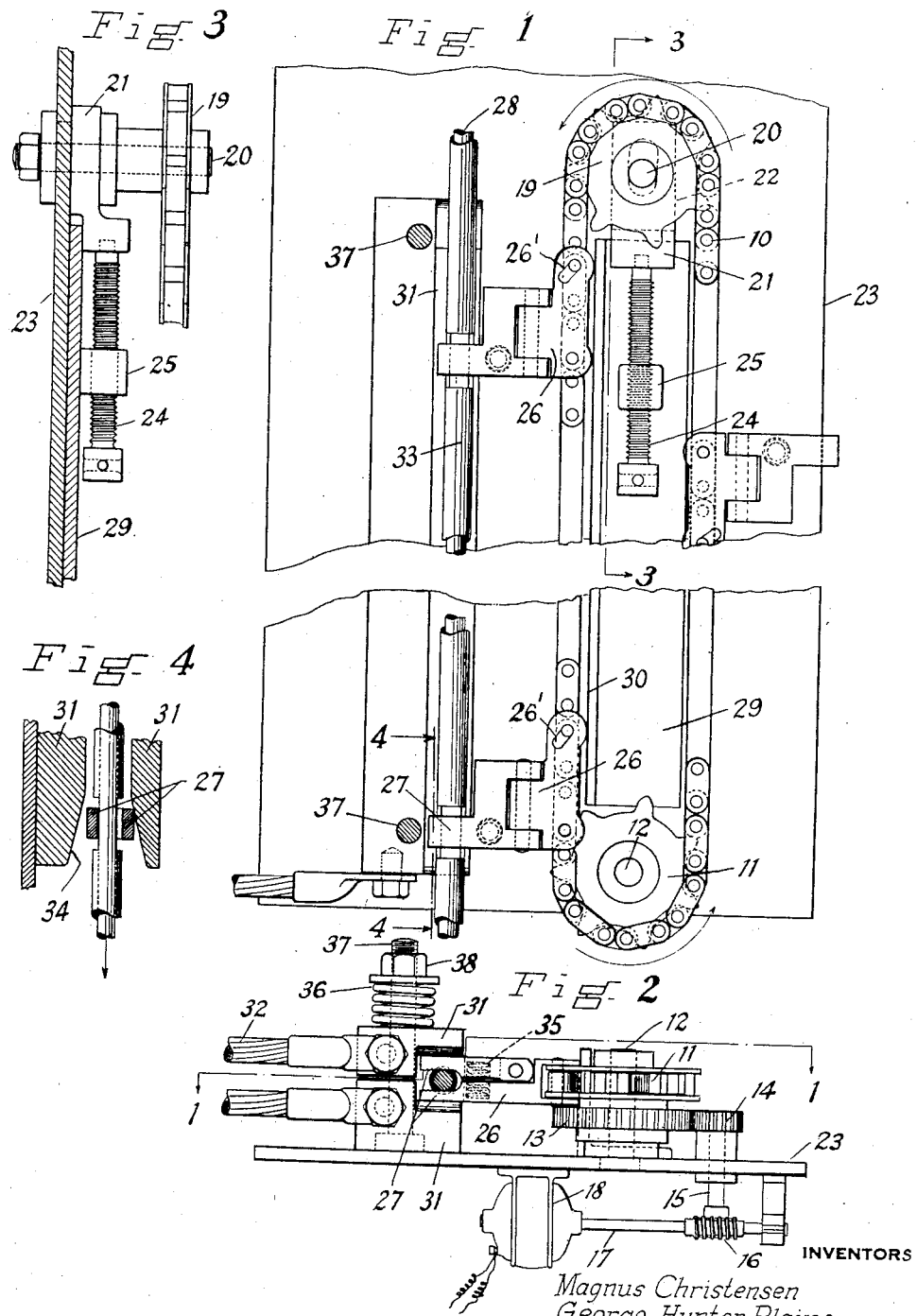
INVENTORS
Magnus Christensen
George Hunter Plaine
James Edward Trainer 2nd
James Campbell Hodge
BY
ATTORNEY Oct. 25, 1938.  M. CHRISTENSEN ET AL  2,133,971
WELDING APPARATUS
Original Filed July 2, 1930    2 Sheets-Sheet 2
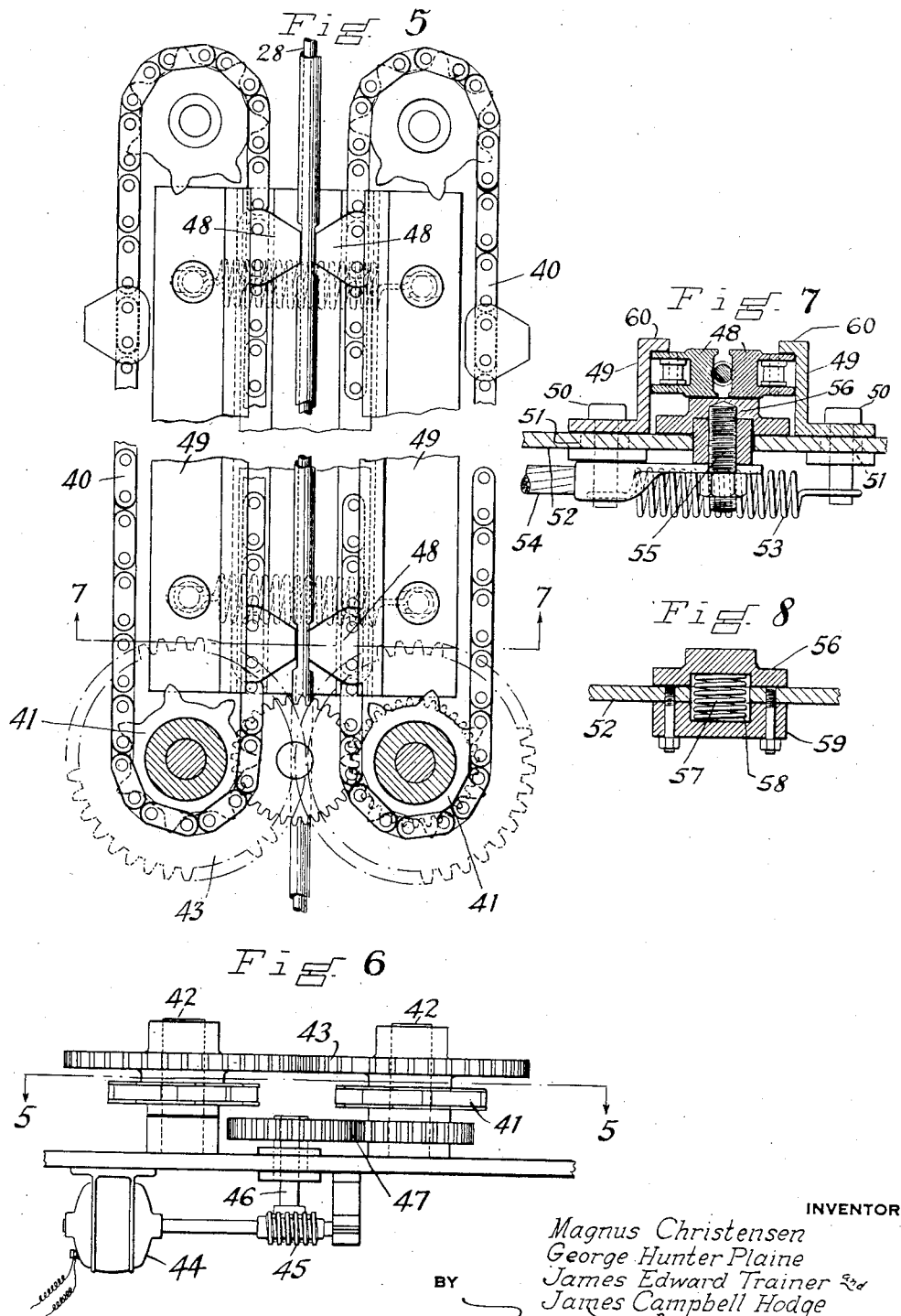
INVENTORS
Magnus Christensen
George Hunter Plaine
James Edward Trainer
James Campbell Hodge
BY
ATTORNEY Patented Oct. 25, 1938

2,133,971

UNITED STATES PATENT OFFICE 2,133,971

WELDING APPARATUS

Magnus Christensen and George Hunter Plaine, Barberton, and James Edward Trainer, Fairlawn, and James Campbell Hodge, Akron, Ohio, assignors to The Babcock & Wilcox Company, Newark, N. J., a corporation of New Jersey Original application July 2, 1930, Serial No. 465,348. Divided and this application January 12, 1938, Serial No. 184,538

19 Claims. (Cl. 219—8)

This invention relates to welding and more particularly to a method and apparatus for operating the movable electrode or welding rod employed in arc welding.

An object of this invention is to provide an improved mechanism for holding and feeding the movable electrode in an arc welding device.

A further object is to provide an improved method of arc welding permitting a continuous deposition of the welding metal.

These and other objects which will be apparent to those skilled in this particular art are accomplished by means of the invention illustrated in the accompanying drawings in which Fig. 1 is a view in elevation of an electrode feeding mechanism constructed in accordance with one embodiment of this invention, the view being partly in section on the line 1—1 of Fig. 2;

Fig. 2 is a bottom view of the arrangement shown in Fig. 1;

Fig. 3 is a transverse sectional view on the line 3—3 of Fig. 1;

Fig. 4 is a similar view on the line 4—4 of Fig. 1;

Fig. 5 is a view similar to Fig. 1 showing a modified arrangement of the electrode feeding mechanism partly in section on the line 5—5 of Fig. 6;

Fig. 6 is a bottom view of the arrangement shown in Fig. 5;

Fig. 7 is a transverse sectional view on the line 7—7 of Fig. 5; and

Fig. 8 is a view of a detail.

This application is a divisional application of the parent application, Ser. No. 465,348, filed on July 2, 1930.

In arc welding, the welding rod forms one electrode of the arc and the metal of the rod is deposited in the joint being welded. As the rod is thus consumed it is fed longitudinally to compensate for the metal so deposited, and when the rod is entirely consumed a new one is substituted.

The particular embodiments of the present invention which have been chosen for the purposes of illustration are particularly useful in feeding long lengths of covered electrode, the covering of which is inadequate as a current conductor, although it will be apparent that the arrangement is equally useful in connection with other forms of electrodes or welding rods.

As illustrated in Figs. 1 to 4 the device includes an endless chain 10 or the like engaging a driving sprocket 11 on the shaft 12 provided with a driving gear 13 meshing with a spur gear 14 on a shaft 15 driven by a worm 16 on the shaft 17 of a driving motor 18. The upper end of the chain engages an idler sprocket 19 supported on a shaft 20 rotatably mounted in a movable bracket 21 positioned for vertical movement in a slot 22 in the supporting panel 23. An adjusting screw 24 threaded through a supporting lug 25 supports the bracket 21 in the desired position.

Spaced longitudinally along the chain 10 are a succession of combination electrode gripping jaws and contact shoes which are arranged to grip the associated electrode at predetermined points for feeding it toward the work and at the same time supplying the necessary current thereto. As illustrated, these devices comprise link members 26 secured to the chain at equally spaced intervals, each link member being provided with electrode gripping jaws 27, one of which is pivotally mounted on the other so as to be movable toward and from the other for gripping and releasing the electrode 28. A guide plate 29 has a face 30 for engaging the link members 26 and guiding the feeding movement thereof. The jaws 27 not only grip the electrode 28 but serve as contact shoes for supplying the welding current thereto. Current supplying bars or rails 31 are so positioned as to provide a slot through which the jaws 27 pass and in which they are pressed together by contact with the sides of the slot. Current is delivered to the rails through suitable conductors 32 and by the shoes 27 to the electrode 28. The rails 31 are yieldingly pressed together by springs 36 surrounding rail supporting bolts 37 and positioned between a holding nut 38 and the adjacent rail. The electrode 28 has a coating 33 which has been removed at equally spaced intervals, corresponding to the spaces between the gripping jaws to provide points of contact for the gripping jaws or shoes 27. Each link member 26 has a slotted connection 26' at one end to permit free movement thereof around the associated sprockets.

It will be apparent that operation of the motor 18 will cause a feeding movement of the chain and jaws 27, the latter gripping the electrode at those points where the coating is removed. Any desired number of gripping jaws may be employed, they being equally spaced longitudinally of the chain. As each pair of jaws comes into position the beveled upper ends 34 of the contact rails 31 press the jaws together, against the pressure of springs 35, causing them to yieldingly grip the electrode at an uncoated point, thus providing a path for the current from the rails to the electrode and at the same time feeding the latter downwardly at a predetermined rate governed by the speed of the driving motor 18. The lower ends of the rails 31 are flared or beveled to permit the rod to be released by the jaws 27 as they reach the end of their downward travel, at which time a succeeding set of jaws has moved into bar gripping position above, the release of the jaws at the lower end not occurring until the jaws at the top have securely gripped the rod.

In the form of the invention illustrated in Figs. 5 to 8, a pair of endless chains 40 are driven by sprockets 41 mounted on shafts 42 connected by gears 43 for simultaneous operation. A driving motor 44 having a worm 45 drives a stud shaft 46 connected by gearing 47 to one of the sprocket shafts 42. The chains 40 are located so that the inner runs of the chains are parallel and adjacent to one another. Combination contact shoes and electrode gripping jaws 48 are secured to each chain at predetermined equally spaced intervals and are so positioned that the jaws on one chain co-operate with the jaws on the other chain to grip the electrode between them as they move downward between presser plates 49 mounted on supporting studs 50 extending through the supporting panel 52. The studs 50 supporting one of the plates 49 extend through slots 51 in the panel 52 to permit relative movement of the plates 49 toward and away from each other. A spring 53 draws the movable presser plate 49 toward the other thus pressing the co-operating jaws 48 of each pair into gripping engagement with the electrode. Welding current is supplied to the electrode from the cable 54 which is connected by a stud bolt 55 with a contact rail or bar 56. The latter is spring-pressed inwardly against the shoes or jaws 48 by springs 57 engaging the side of the rail and mounted in pockets 58 formed in a supporting block 59 secured to the supporting panel. Each presser plate 49 has an outer flange 60 against which the jaws or shoes are pressed by the pressure of the contact rail 56.

In operation, the coating of the electrode is removed at equal intervals and movement of the chains causes each pair of jaws to grip the rod at the uncoated intervals and feed it downwardly as will be readily understood. The presser plates 49 maintain the jaws in gripping position and the electric rail 56 delivers the welding current to the jaws. Prior to the jaws reaching the lower end of the run, a new pair of jaws has been moved into position to grip the rod and continue the feed thereof after the pair of jaws at the lower end of the run has been separated and caused to release the rod by passing around the associated sprockets 41.

In either form of the device, the rate of feed of the rod can be determined and adjusted by regulating the speed of the driving motor. The regulation can be such that the feed of the rod will be uniform where the speed at which it is used up is uniform, and vice versa. In the same way, feed of the electrode can be proportioned to the longitudinal feed of the machine along the work or along the seam being welded.

It will be apparent that according to the method of welding disclosed herein where the outer end of the welding rod is left free it will be unnecessary to stop the welding operation for the purpose of inserting a fresh rod in the machine as the old rod is used up. The new rod can be welded directly to the end of the old independently of and without affecting the welding operation of the machine proper, and fed to the work continuously, or, if a flexible rod is employed a long length of it can be supplied from a reel or the like and fresh lengths welded to the ends of preceding lengths.

Although we have described certain features of the present invention in more or less detail it will be apparent that various changes, additions, omissions and substitutions can be made therein without departing from the spirit of this invention or the scope of the appended claims.

What is claimed is:

1. An electrode feeding device for arc welding machines including a plurality of traveling contact shoes successively engaging a movable electrode with a non-cutting action, means for maintaining the shoes pressed against the electrode throughout its feeding range, means for moving said shoes to feed said electrode longitudinally, and an electrical contact member positioned to engage said shoes when in gripping position for supplying current to said electrode.

2. An electrode feeding device for arc welding machines including an endless chain, pairs of relatively movable gripping jaw members on said chain for holding an electrode, means for moving said chain to feed said electrode, and means co-operating with said jaw members for simultaneously supplying a welding current to said electrode and causing said members to press against the metal of the electrode without any cutting action.

3. An electrode feeding device for arc welding machines including an endless chain, gripping jaw members on said chain for holding an electrode, means for moving said chain to feed said electrode, a current conducting rail engaging said jaw members for supplying a welding current to said electrode, and means for causing said jaw members to grip and release said electrode at predetermined points.

4. A device for feeding a coated electrode for arc welding having the coating removed at longitudinally spaced points, including gripping jaws engaging said electrode with a non-cutting action at said points only, means for moving said jaws to feed said electrode and means for connecting said electrode to a source of current through said jaws.

5. A device for feeding an electrode for arc welding including a pair of jaws for gripping said electrode, means for moving said jaws to feed said electrode longitudinally and a contact rail along which said jaws slide for delivering a welding current to said electrode.

6. A device for feeding an electrode for arc welding including an endless chain, means for continuously moving said chain, successive pairs of electrode gripping jaws spaced along said chain, a pair of electric rails positioned so as to provide a slot through which said jaws pass, means for pressing said rails against said jaws to cause said jaws to grip an associated electrode and means for supplying a welding current to said electrode through said rails.

7. A device for feeding an electrode for arc welding including a pair of endless chains positioned so as to have parallel runs adjacent each other, current conducting contact shoes successively positioned along said chains, the shoes on one chain being arranged to cooperate with the shoes on the other chain for gripping an electrode between them, presser plates for yieldingly pressing said shoes into engagement with an associated electrode, a current conducting contact rail located between the adjacent runs of said chains and means for yieldingly pressing said contact rail into engagement with said shoes during feeding movement thereof.

8. A device for feeding an electrode for arc welding including an endless chain, means for continuously moving said chain, successive pairs of relatively movable electrode gripping jaws spaced along said chain, a pair of electric rails positioned so as to provide a guideway through which said jaws pass, springs pressing said rails against said jaws to cause said jaws to grip an associated electrode and means for supplying a welding current to said electrode through said rails.

9. A device for feeding an electrode for arc welding including a pair of endless chains positioned so as to have parallel runs adjacent each other, current conducting contact shoes successively positioned along said chains, the shoes on one chain being arranged to cooperate with the shoes on the other chain for gripping an electrode between them, members yieldingly pressing said shoes against the interposed electrode, a current conducting contact rail located adjacent the inner runs of said chains, and means for yieldingly pressing said contact rail into engagement with said shoes during feeding movement thereof.

10. In an electrode feeding apparatus, opposed endless feeders between the inner runs of which an electrode is gripped, opposed electrode gripping devices carried by the feeders, means for causing said devices to be yieldingly pressed against the electrode throughout the feeding range of the apparatus, means for moving the feeders, and operating connections causing the feeders to move in unison.

11. In an electrode feeding apparatus, travelling electrode gripping devices, spring impelled means causing said devices to yieldingly grip an electrode throughout its feeding range with non-cutting action, electrical conductor means contacting with said devices throughout their feeding range, and means for moving the devices to advance the electrode, said spring impelled means operating to control said devices to the end that the electrode is released from their grip at the end of the feeding range.

12. In an arc-welding machine of the character described in which an electrode is fed to an arc struck between said electrode and the work, the combination of an electrode feeding means, welding current supply means, a guide connected to said current supply means, said guide being adjacent the path defined by said electrode in its passage to the arc and of a length to extend between two spaced points in said path, a plurality of spaced contact members movable in a path a portion of which includes the path of the electrode between said two spaced points, said contact members being adapted to contact with said guide and the electrode while passing between said spaced points, and means for moving said contact members at the speed of the electrode as they pass between said spaced points.

13. Apparatus for conducting current to a fluxed welding electrode having a metallic core as it is fed to perform a welding operation comprising a plurality of contact making forks disposed to automatically electrically engage the metallic core of the electrode at predetermined fixed intervals.

14. In an electric welding machine, means for feeding a coated fusible weld rod, said means embodying a pair of endless flexible members, drums about which said members pass, the adjacent runs of said members being arranged parallel and spaced for the reception of the rod therebetween, rod engaging elements carried by the flexible members and adapted to contact with and grip the bare rod at points spaced longitudinally of the rod, guides for holding the portions of the said adjacent runs of the flexible members between the drums against lateral separation, and means for actuating said flexible members.

15. In an electric welding machine, means for feeding a coated fusible weld rod, said means embodying a pair of endless flexible members, drums over which the said members pass, the adjacent runs of said members being arranged parallel and spaced for the reception of the rod therebetween, rod engaging elements carried by the flexible members and adapted to contact with and grip the bare rod at points spaced longitudinally of the rod, guides for holding the portions of said adjacent runs of the flexible members between the drums against lateral separation, means for actuating said drums, and means for adjusting the guides to vary the space between the adjacent runs of the flexible members between the drums to compensate rods of different diameters.

16. In an arc welding machine adapted to employ a welding electrode covered with non-conducting material scored at points along its length to successively expose small areas of the conducting core as the electrode is fed to the arc, welding current supply means fixed relative to the electrode path and positioned between spaced points in the electrode path, and means movable with the electrode between said spaced points and normally out of contact with said current supply means adapted to electrically connect the exposed areas of the electrode with said current supply means as the areas pass between said spaced points.

17. In an arc welding machine of the character described in which an electrode is fed to an arc struck between said electrode and the work, welding current supply means, a guide connected to said current supply means, said guide being adjacent the path defined by said electrode in its passage to the arc and of a length to extend between two spaced points in said path, a plurality of spaced contact members movable in a path a portion of which includes the path of the electrode between said two spaced points, said contact members being movable into contact with said guide and the electrode while passing through said spaced points and movable out of contact with the guide beyond said points, and means for moving said contact members at the speed of the electrode as they pass between said spaced points.

18. Apparatus for conducting current to a fluxed welding electrode having a metallic core bare at successive spots as it is fed to perform a welding operation comprising a plurality of contact making forks disposed to automatically electrically engage the metallic core of the electrode at said successive spots.

19. In an arc-welding machine adapted to use a welding electrode having a conducting core and a non-conducting covering therefor interrupted at regular intervals to provide current conducting contact areas, welding circuit connections, means defining a substantially continuous contact zone of a length exceeding the distance between a plurality of the contact areas of the welding electrode, means electrically connecting said contact zone defining means to said connections and means for passing said electrode through said contact zone on its way to the arc.

MAGNUS CHRISTENSEN.
GEORGE HUNTER PLAINE.
JAMES EDWARD TRAINER.
JAMES CAMPBELL HODGE.